May 13, 1930. M. ROSEN Re. 17,668

PACKAGE

Original Filed Aug. 24, 1927

Witness
William P. Kilroy

Inventor
Martin Rosen
By Samuel W. Banning Jr. Atty.

Reissued May 13, 1930

Re. 17,668

UNITED STATES PATENT OFFICE

MARTIN ROSEN, OF CHICAGO, ILLINOIS, ASSIGNOR TO SUN GOODS CORPORATION, OF CHICAGO, ILLINOIS, A CORPORATION OF ILLINOIS

PACKAGE

Original No. 1,691,306, dated November 13, 1928, Serial No. 215,004, filed August 24, 1927. Application for reissue filed March 7, 1930. Serial No. 434,154.

This invention relates to a package and method of making the same, particularly to a package containing loose confections, such, for example, as raisins, nuts, hard candies, nuts and raisins, and the like.

The main object of the invention is the production of a package, particularly for loose confections, in which the package is provided with a relatively stiff rear wall for maintaining said package in extended form, and the remaining walls of said package being formed from a single piece of transparent material, such, for example, as "glassine" paper, cellophane, or the like, whereby a clear view is had of the contents of the package.

A further object of the invention is the production of a package, particularly for loose particles of food, in which the food particles are enclosed within a transparent wrapper, all except one of the corners of which are folded over and attached to the rear face of a relatively stiff sheet which forms the rear wall of said package, the remaining corner of said wrapper being disposed between the contents of the package and the inner face of said stiff sheet, whereby the said last mentioned corner may be pulled out and assist in dispensing the contents of the package therefrom.

A still further object of the invention is the production of a package, particularly for loose confections, which will be easily and cheaply made, compact, and neat and attractive in appearance.

Other objects and advantages of the invention will become apparent during the course of the following description taken in connection with the accompanying drawings.

In the accompanying drawings forming a part of this application and in which like numerals designate like parts throughout the several views.

In carrying the invention into effect, a package is produced filled with loose confections, such, for example, as raisins, nuts, hard candies, nuts and raisins, and the like, one wall of which package is relatively stiff, and the remaining walls of which are formed from a single piece of diamond-shaped transparent paper, such, for example, as "glassine" paper, cellophane, or the like, said transparent paper having three corners thereof folded over and secured to the relatively stiff wall, and the remaining corner being disposed between the contents of the package and the inner face of said stiff wall, whereby the said last mentioned corner may be pulled out and assist in dispensing the contents from the package.

In the method contemplated of forming the package, a diamond-shaped wrapper 10, of transparent material, such, for example, as "glassine" paper, cellophane, or the like, is depressed in its central portion to form a pocket or depression 11, said pocket being preferably square shaped and of a substantial depth. This pocket or depression 11 may be formed by means of a recess 12 and a plunger 13, adapted to be received within the said recess, the size and shape of the recess being the same as the size and shape of the finished package, and the depth of said recess being the same as the desired thickness of the finished package.

Figure 1:
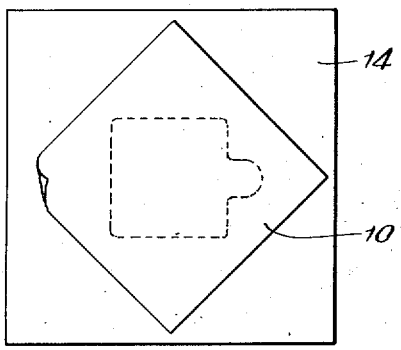
Figure 1 is a top plan view of the diamond-shaped wrapper used in carrying the invention into effect, said wrapper being shown in position on a form and ready for the first step in the series of steps in forming and filling the package.
Figure 2:
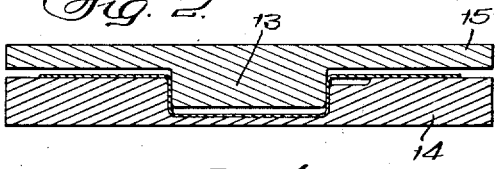
Figs. 2 to 7 illustrate the successive steps of forming and filling the package.
Figure 3:
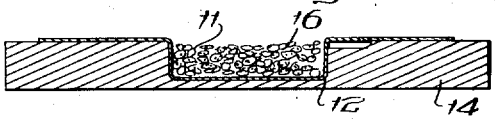

The recess 12 may be provided in a substantially square-shaped member 14, said member 14 being of sufficient size to accommodate the wrapper 10 in the position shown in Fig. 1. The plunger 13 may be mounted on a substantially diamond-shaped member 15, said member being of substantially the same size as the wrapper 10.

The first step then in the method of forming the package is to place the diamond-shaped wrapper 10 on the member 14 over the recess 12, as shown in Fig. 1. The plunger 13 is then moved to its lowermost position in the recess 12, depressing the central portion of the wrapper 10 to form the pocket 11 therein, the corners of the wrapper being held flat against the upper surface of the member 14, by the member 15, upon which the plunger 13 is mounted, thus the turning up of the corners of the wrapper is prevented in the formation of the pocket in the wrapper.

Figure 4:
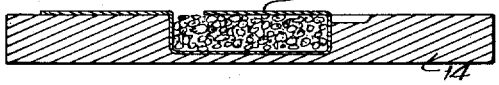
Figure 5:
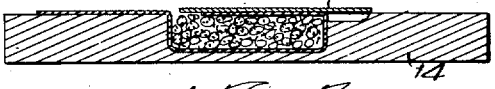
Figure 6:
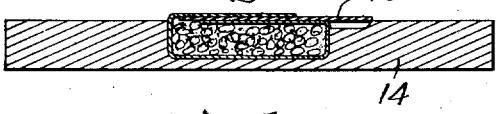
Figure 7:
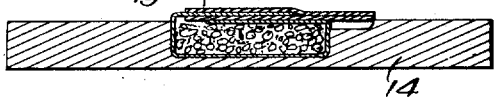

When the pocket has been formed and the plunger withdrawn, the confections 16 are placed in the pocket and tamped down, said pocket being filled just up to the level of the top thereof, as shown in the drawings. Then one of the corners of the wrapper 10, the corner 17 for example, is folded over the top of the confections, as shown in Fig. 4. The next step is to place a stiff sheet 18 on top of the confection 16, and of course over the folded over corner 17, of the wrapper, the size and shape of said stiff sheet being the same as the size and shape of the recess 12, which of course is the same as the desired size and shape of the finished package.

After the stiff sheet 18 has been placed in position, the remaining three corners of the wrapper 10 are folded over and down flat on the sheet 18, thus completely enclosing the confections within the package. An adhesive strip 19 is then applied to the folded over corners of the wrapper and the stiff sheet 18, to hold the said corners in position and to seal the package. The adhesive strip 19 may be of any desired size and shape, but it is preferably of the same size and shape as the stiff sheet 18. The finished package may then be lifted out of the recess 12 in fully assembled condition.

The stiff sheet 18 may be provided with an extension or ear 20, having a perforation therein for supporting the package on a display stand or the like. The extension or ear 20 also aids in lifting the package after it has been fully assembled out of the recess 12.

It will thus be seen that my invention provides a package for containing loose confections, which may be easily and readily assembled, and which will be neat and attractive in appearance, as the substantially flat back of the package permits it to be attractively displayed on a stand, card or the like.

Figure 9:
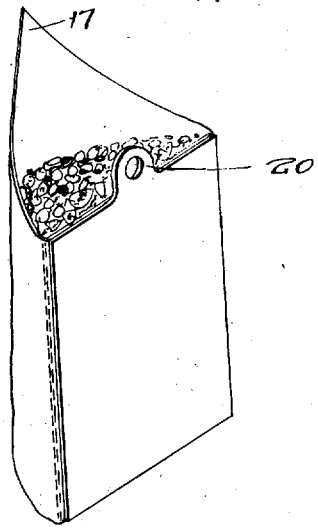
Fig. 9 illustrates the finished package with the upper flap pulled out for assisting in dispensing the contents from the package.
Figure 8:
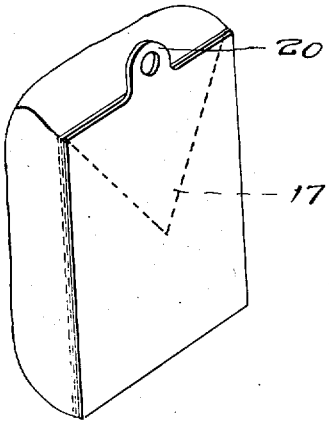
Fig. 8 illustrates the finished package.

The free corner 17 of the wrapper 10 which is disposed between the confections and the inner face of the stiff sheet 18, is adapted to be pulled out when it is desired to get to the contents of the package, and as is apparent from Fig. 9 of the drawings, said corner is adapted to assist in dispensing the contents from the package, said corner acting as a trough or apron over which the confections are adapted to pass.

I am aware that changes may be made in the size and shape of the package, and I reserve the right to make all such adaptations of and changes in the construction of my invention as fairly fall within the scope of the following claims.

What I claim and desire to secure by Letters Patent of the United States is:

1. A package comprising in combination loose particles of food, a stiff sheet and a diamond-shaped wrapper for enclosing said particles of food, three corners of said wrapper being folded over and secured to one face of said sheet, the remaining corner of said wrapper being disposed between said contents of the package and the other face of said sheet, whereby said last mentioned corner may be pulled out and assist in dispensing the contents from the package.

2. A package comprising in combination loose confections, a stiff sheet forming one wall of said package and adapted to maintain said package in extended form, a wrapper of transparent material forming the remaining walls of said package, all except one of the corners of said wrapper being folded over the outer face of said stiff sheet, the remaining corner of said wrapper being disposed between said confections and the inner face of said stiff sheet, and a device for holding said folded over corners and sheet together.

3. A package comprising in combination loose particles of food, a stiff sheet and a transparent wrapper for enclosing said particles of food, said stiff sheet forming the rear wall of said package, the remaining walls of said package being formed by said transparent wrapper, all except one of the corners of which wrapper being folded over the outer face of said sheet, the remaining corner of said wrapper being disposed between the inner face of said sheet and the particles of food, and an adhesive strip for holding the folded over corners of the wrapper and the sheet together.

4. A package comprising in combination loose confections, a stiff sheet and a diamond shaped wrapper for enclosing the said confections, all except one of the corners of said wrapper being folded over and attached to said stiff sheet, the remaining corner of said wrapper being adapted when in one position to prevent the spilling of the contents from the package, and when in another position to assist in dispensing the contents from the package.

5. A package comprising in combination an article to be enclosed, a stiff thin flat insert sheet rectangular in general outline, and a wrapper of thin transparent material of larger dimensions and also rectangular in outline and disposed in diagonally flatwise relation to the insert sheet to provide corner portions extending beyond the contiguous edges of the stiff insert sheet, and having at least three of said projecting corner portions folded over the adjacent edges of the stiff insert sheet to bring the apices of the corners substantially to the center and in contiguous relation to one another, and an exteriorly disposed adhesive sealing strip overlying and sealing all of the said folded over corners to provide a stiff substantially rectangular package, leaving the transparent side opposite the over-folded corners unobstructed for inspection of the contents.

MARTIN ROSEN.